United States Patent [19]
Anthony

[11] 3,787,286
[45] Jan. 22, 1974

[54] FUEL ASSEMBLY FLOW REDISTRIBUTION

[75] Inventor: Andrew James Anthony, Tariffville, Conn.

[73] Assignee: Combustion Engineering, Inc., Windsor, Conn.

[22] Filed: Dec. 17, 1971

[21] Appl. No.: 209,081

[52] U.S. Cl.................. 176/78, 176/76, 176/81
[51] Int. Cl..................... G21c 3/32, G21c 15/24
[58] Field of Search........ 176/73, 74, 75, 76, 78, 81

[56] References Cited
UNITED STATES PATENTS

| | | | |
|---|---|---|---|
| 3,179,570 | 4/1965 | Foll | 176/81 X |
| 3,030,293 | 4/1962 | Wyatt | 176/81 |
| 2,990,359 | 6/1961 | Wyman | 176/81 |
| 3,308,034 | 3/1967 | Schmidt | 176/81 |
| 3,260,652 | 7/1966 | Ritz et al. | 176/81 |
| 3,105,037 | 9/1963 | Weems | 176/81 |
| 3,356,587 | 12/1967 | Heck, Jr. | 176/78 |
| 3,481,832 | 12/1969 | Rickert | 176/78 |
| 3,423,287 | 1/1969 | Anthony et al. | 176/78 |
| 3,070,537 | 12/1962 | Treshow | 176/78 |
| 3,216,904 | 11/1965 | Challender et al. | 176/81 |

Primary Examiner—Carl D. Quarforth
Assistant Examiner—Roger S. Gaither
Attorney, Agent, or Firm—John F. Carney

[57] ABSTRACT

Flow deflector apparatus is provided in fuel assemblies of a nuclear reactor to effect mixing of the coolant flowing in channels between adjacent members thereof. The apparatus comprises metal strips containing pre-punched tab projections that are attached to at least some of the members that comprise the fuel assemblies.

5 Claims, 10 Drawing Figures

PATENTED JAN 22 1974 3,787,286

INVENTOR.
ANDREW J. ANTHONY
BY John E. Carney
ATTORNEY

PATENTED JAN 22 1974

INVENTOR.
ANDREW J. ANTHONY
BY
John F. Carney
ATTORNEY

FUEL ASSEMBLY FLOW REDISTRIBUTION

BACKGROUND OF THE INVENTION

It is well known that the fuel or fissionable material for heterogeneous nuclear reactors is conventionally in the form of fuel elements or rods which are grouped together in the reactor core in assemblies that also include rods comprising burnable poisons as well as hollow tubes through which control element assemblies are arranged to pass. The liquid moderator-coolant, normally water, flows upwardly through the reactor core in channels or longitudinal passageways formed between the members that comprise the core. One of the operating limitations on current reactors is established by the onset of film boiling on the surfaces of the fuel elements. The phenomenon is commonly referred to as departure from nucleate boiling (DNB) and is affected by the fuel element spacing, system pressure, heat flux, coolant enthalpy and coolant velocity. When DNB occurs, there is a rapid rise in the temperature of the adjacent fuel element due to the reduced heat transfer which can ultimately result in failure of the element. Therefore, in order to maintain a factor of safety, nuclear reactors must be operated at a heat flux level somewhat lower than that at which DNB occurs. This margin is commonly referred to as the "thermal margin."

Nuclear reactors normally have some regions in the core which have a higher neutron flux and power density than other regions. This situation may be caused by a number of factors, one of which is the presence of control rod channels in the core. When the control rods are withdrawn, these channels are filled with moderator which increases the local moderating capacity and thereby increases the power generated in the adjacent fuel. In these regions of high power density known as "hot channels," there is a higher rate of enthalpy rise than in other channels. It is such hot channels that set the maximum operating conditions for the reactor and limit the amount of power that can be generated since it is in these channels that the critical thermal margin is first reached.

Attempts have been made in the past to solve the above problems by providing the support grid structures employed to contain the members of the fuel assemblies with integral flow deflector vanes. A support grid structure of this type is described in copending U. S. Pat. application Ser. No. 157,207 to D. M. Krawiec, filed June 28, 1971, and assigned to the assignee of the present application.

Although support grid structures having integrally formed mixing vanes improve by some degree, the coolant flow and heat transfer conditions that gave rise to the above-mentioned problems, they nonetheless manifest certain undesirable characteristics. The support structure, being of "egg crate" construction and therefore having a tendency to straighten the path of coolant flow through the structure, operates against, and thereby reduces the effectiveness of, the mixing vanes. Also, to locate mixing vanes such that they extend into the spaces included by the components of the grid structure reduces the available coolant flow area through the structures thereby increasing the amount of pressure loss experienced by the coolant in flowing through the core. This, of course, results in a concomitant increase in pumping requirements and operating costs.

It is toward the solution of the above-mentioned problems therefore that the present invention is directed.

SUMMARY OF THE INVENTION

According to the present invention an improved form of flow deflector apparatus is provided for use in nuclear reactor fuel assemblies. The apparatus comprises metal strips that are attached to selected numbers of the fuel assemblies in operable position within the coolant flow channels. The metal strips contain a plurality of longitudinally spaced tab projections that extend into the flow channels and operate to deflect and otherwise mix coolant from the various channels in order to distribute the enthalpy rise in the coolant over the entire cross section of the core.

The metal strips are arranged to be positioned at selected locations such that the tab projections operate in regions of the coolant flow channels disposed exteriorly in the longitudinal sense of the respective support grid structures so as to create more effective mixing of the coolant. The flow deflector apparatus of the invention, as compared with known apparatus of the prior art, is also effective to reduce the pressure loss experienced by the coolant in flowing through the reactor core thereby resulting in reduced pumping requirements and concomitant plant operating costs.

For a better understanding of the invention, its operating advantages and the specific objects obtained by its use, reference should be made to the accompanying drawings which relate to various embodiments of the invention.

DESCRIPTION OF THE PREFERRED EMBODIMENTS

Figure 1:
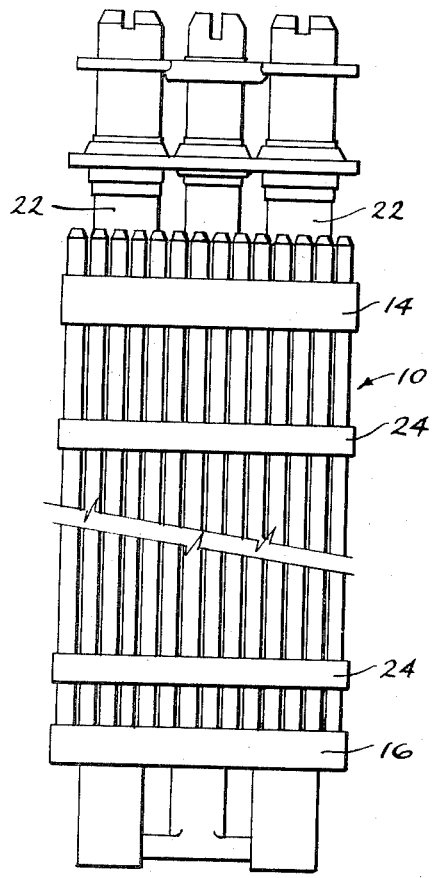
FIG. 1 is an elevational view of a typical fuel assembly of a heterogeneous nuclear reactor.
Figure 2:
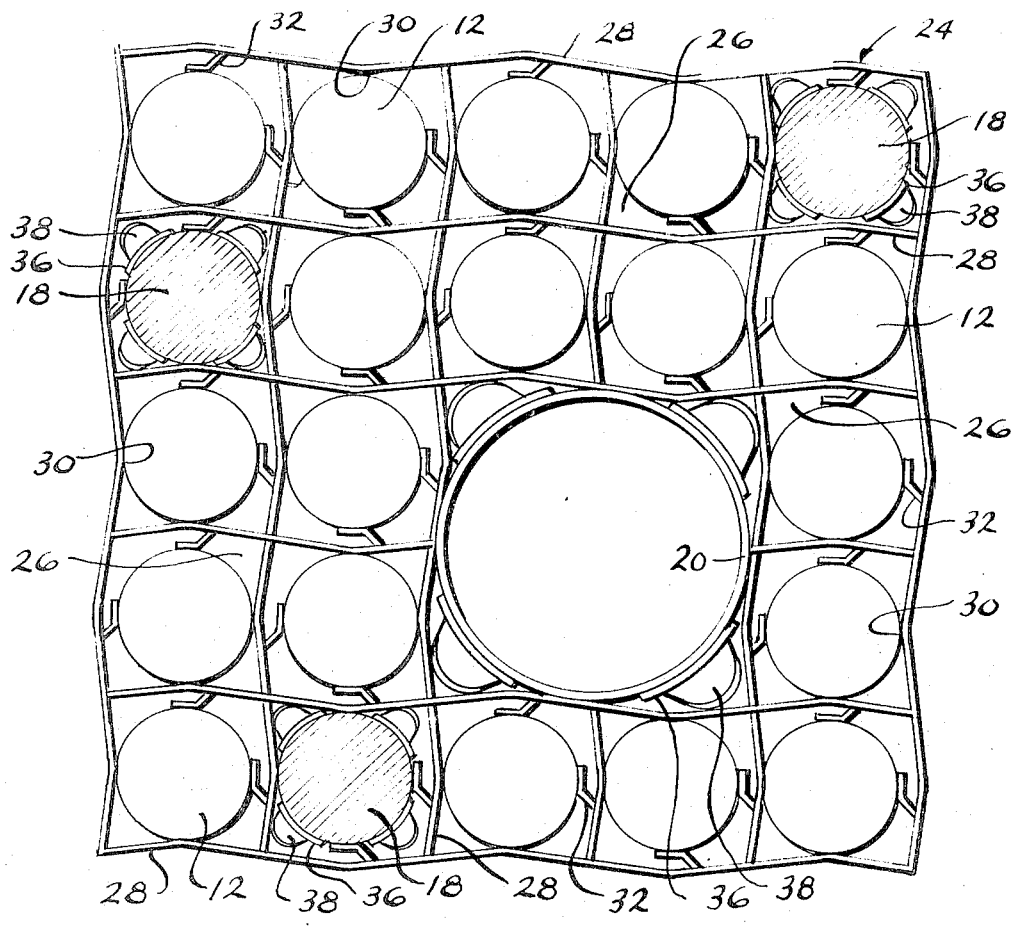
FIG. 2 is an enlarged plan view of a portion of the fuel assembly of FIG. 1.

Referring now to the drawings, FIG. 1 illustrates a typical heterogeneous nuclear reactor fuel assembly 10 containing a plurality of individual fuel elements 12 that are held in place by upper and lower spacer grids 14 and 16. Interspersed throughout the fuel assembly are a number of burnable poison rods 18 (FIG. 2) of generally the same external configuration as the fuel elements 12 and also engaged at their upper and lower ends by the spacer grids 14 and 16. The fuel assembly 10 further includes a plurality of hollow cylindrical guide tubes 20 that are substantially coextensive with the fuel elements 12 and the poison rods 18 but of a somewhat enlarged diameter with respect thereto.

Within the guide tubes 20 control rod elements (not shown) are operable in a manner to regulate the operation of the reactor core in a manner well known in the art.

At longitudinally spaced points throughout the length of the fuel assembly 10 are disposed support structures 24 which operate to transversely space the assembly members from one another thereby forming interstitial flow channels 26. As shown best in FIG. 2 the support structures 24 comprise a plurality of intersecting elongated plates or straps 28 arranged in lattice array. In the arrangement shown, the plates 26 are of serpentine configuration resulting in the formation of hard stops 30 against which the members of the fuel assembly are pressed by stamped resilient spring fingers 32 that serve to laterally engage and position the assembly members.

Figure 7:
FIGS. 5, 6 and 7 are elevational, plan and side views respectively of the flow deflector apparatus of FIG. 4.
Figure 5:
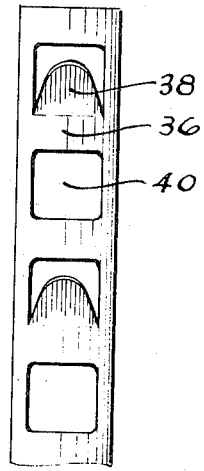
Figure 6:
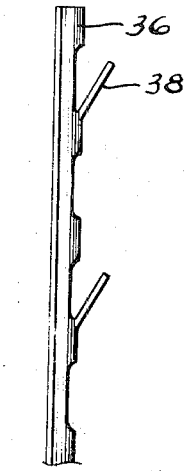
Figure 10:
FIGS. 8, 9 and 10 are elevational, plan and side views respectively of the flow deflector apparatus of FIG. 3.
Figure 8:
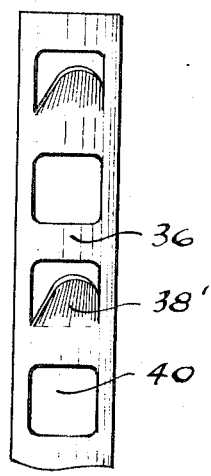
Figure 9:
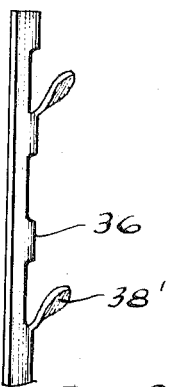

In accordance with the present invention coolant flow deflector apparatus is provided for diverting the flow of coolant fluid from one channel to another in order to promote mixing of the fluid. This apparatus, in the embodiment illustrated in FIGS. 3, 5, 6 and 7 comprises a longitudinally extensive, thin metal strip 36, that bears a number of laterally offset tab projections. A number of these strips attached, by welding or otherwise, at circumferentially spaced points about the external surface of selected fuel assembly members. As shown in the drawings, the strips 36 are of generally rectangular configuration but are curved to conform to the surface of the member to which it is applied. The tab projections borne by the metal strips 36 are stamped from the strip material in a cantilever manner to form flow deflector vanes 38. Ideally the material between the vanes 38 is removed, as by means of punched openings 40, in order to minimize the amount of parasitic material that would otherwise have a deleterious effect upon neutron flow within the reactor core. The vanes 38 are deflected from the strip to extend into the adjacent flow channel in order to deflect the fluid flow therealong. As shown in FIGS. 5 through 10, the vanes 38 can be simply angularly displaced (FIGS. 5, 6 and 7) from the plane of the strip or, alternatively, the vanes, indicated as 38', can be both angularly displaced and additionally provided with a slight degree of twist (FIGS. 8, 9 and 10). Vanes 38 bearing the configuration shown in FIGS. 5, 6 and 7 are effective to laterally deflect the flow fluid in the adjacent flow channels and rely upon the turbulence created thereby for mixing. Vanes 38' constructed as shown in FIGS. 8, 9 and 10, on the other hand, impart some degree of rotational motion to the flowing coolant which, as is well known, improves mixing.

Figure 3:
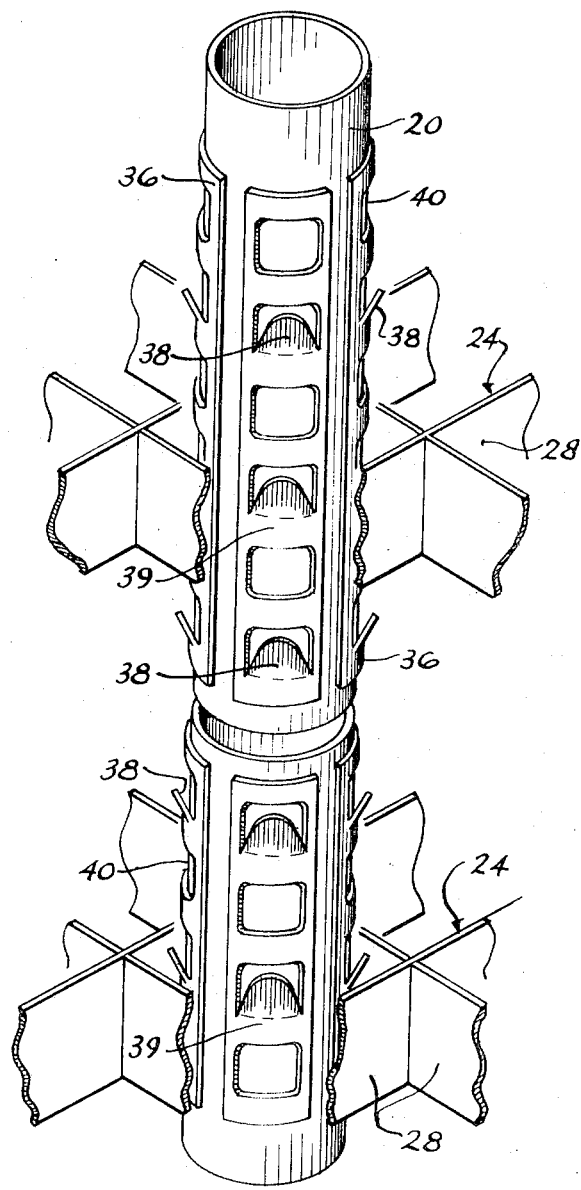
FIG. 3 is an isometric representation of one form of the invention as applied to a control element guide tube.
Figure 4:
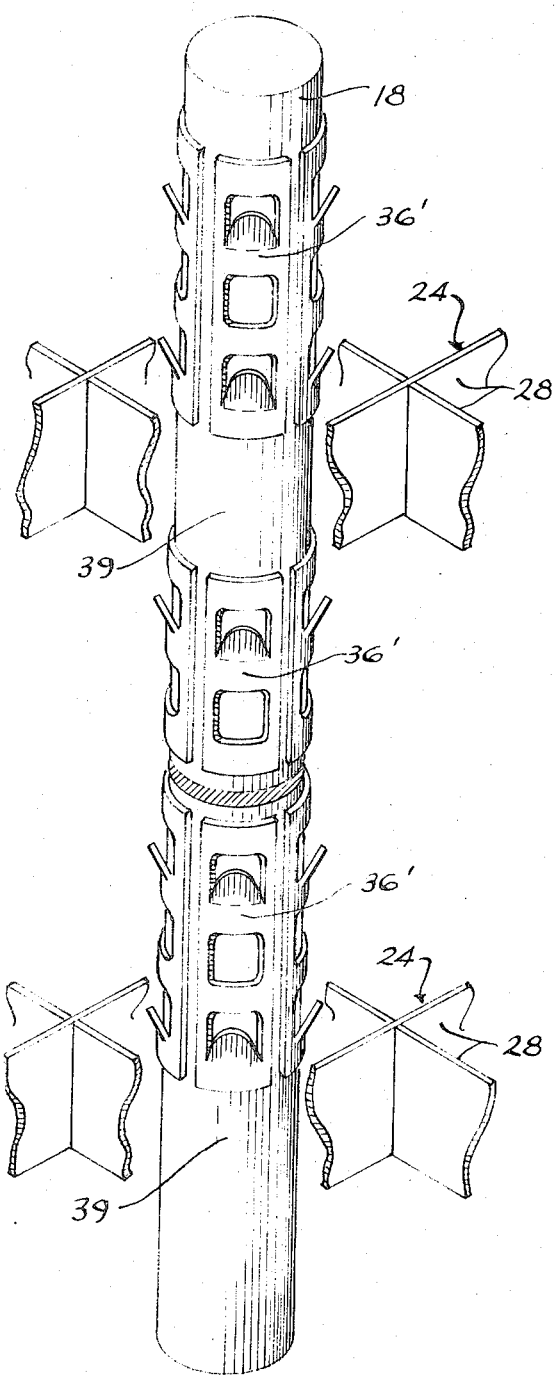
FIG. 4 is an isometric representation of another form of the invention as applied to a burnable poison rod.

The metal strips 36 may be formed to extend continuously over substantially the entire effective length of the fuel assembly 10 as shown in the embodiment of FIG. 3. The vanes 38 borne thereby are longitudinally spaced as closely as is practical to one another along the lengths of the strips. Those portions of each strip disposed within the regions enclosed by the support grid structures, indicated generally as 39, should be devoid of vanes in order to maximize the available coolant flow area in the channels 26. As an alternative the strips, here indicated as 36', may conveniently be formed as shown in FIG. 4 as segments of limited length extending along those portions of the respective fuel assembly members that are disposed externally of the regions enclosed by the support structures 24.

While the strips 36 are capable of attachment to any or all members of the fuel assembly 10 they are most conveniently mounted on each of the non-fuel bearing members, namely the burnable poison rods 18 and the control element guide tubes 20. Being mounted on the poison rods 18 and/or the guide tubes 20, the vanes 38 are operably disposed in those coolant flow channels 26 that are subjected to a higher rate of coolant enthalpy rise due to the increased local moderating capacity inherent therein. Mounting the strips 36 on the fuel elements 12 is less desirable, principally due to the fact that they would impede the transfer of heat from the fuel elements. However, where such effect can be tolerated, the strips may be so mounted especially where it is desirable to eliminate the existence of a "hot channel."

From the foregoing, it is apparent that there is provided flow deflector apparatus for increasing coolant mixing characteristics through the core of heterogeneous nuclear reactors. The mixing vanes are so disposed as to be located outside the regions enclosed by the support structure thereby to increase their mixing effectiveness and also to reduce the pressure loss experienced by the coolant in flow through the reactor core.

It will be understood that various changes in the details, materials, and arrangements of parts which have been herein described and illustrated in order to explain the nature of the invention, may be made by those skilled in the art within the principle and scope of the invention as expressed in the appended claims.

What is claimed is:

1. A fuel assembly for a nuclear reactor comprising:
   a. a plurality of elongated, parallel members, some of which are fuel elements and others of which are non-fuel bearing members;
   b. at least one transversely extending support grid including a plurality of intersecting plates forming enclosures about the respective members and disposing the same in mutually laterally spaced relation to define interstitial flow channels for conducting a fluid coolant in heat exchange relation with said fuel elements; and
   c. means for laterally deflecting at least a portion of the coolant flowing through said flow channels, said means each comprising:
      i. a thin body of strip metal having a surface attached to the external surface of one of said members,
      ii. said body extending substantially parallel to the axis of said member and containing a plurality of longitudinally spaced tab projections struck out from said body, said tab projections being cantilever supported upon said body and extending obliquely outwardly into the adjacent flow channel with the free ends of said tab projections extending in the direction of coolant flow through said adjacent flow channel.

2. Apparatus according to claim 1 wherein said coolant deflecting means are attached only to non-fuel bearing members in said assembly.

3. Apparatus according to claim 1 wherein said coolant deflecting means includes a plurality of strip metal bodies attached to the external surfaces of said selected members and are disposed on circumferential spacing thereabout.

4. Apparatus according to claim 1 wherein all of said tab projections are disposed externally of said support grid enclosures.

5. Apparatus according to claim 1 wherein said tab projections are twisted to impart rotational motion to the coolant flowing through said channel.

* * * * *